(12) United States Patent
Zimmer et al.

(10) Patent No.: US 8,429,387 B2
(45) Date of Patent: Apr. 23, 2013

(54) METHOD AND SYSTEM FOR REMOTE CONFIGURATION OF A COMPUTING DEVICE

(75) Inventors: Vincent J. Zimmer, Federal Way, WA (US); Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 12/785,135

(22) Filed: May 21, 2010

(65) Prior Publication Data

US 2011/0289305 A1    Nov. 24, 2011

(51) Int. Cl.
*G06F 9/00* (2006.01)
(52) U.S. Cl.
USPC .................................. 713/1; 713/2
(58) Field of Classification Search ............ 713/1, 2
See application file for complete search history.

(56) References Cited

U.S. PATENT DOCUMENTS

| | | | |
|---|---|---|---|
| 7,577,828 B2 * | 8/2009 | Sammer et al. | 713/1 |
| 8,028,156 B2 * | 9/2011 | Yamada et al. | 713/2 |
| 2007/0143629 A1 * | 6/2007 | Hardjono et al. | 713/189 |
| 2008/0126711 A1 | 5/2008 | Hobson et al. | |
| 2008/0240057 A1 * | 10/2008 | Halleck | 370/338 |
| 2009/0327741 A1 | 12/2009 | Zimmer et al. | |
| 2010/0169634 A1 | 7/2010 | Pan et al. | |
| 2010/0241836 A1 * | 9/2010 | Proudler | 713/1 |
| 2011/0154009 A1 * | 6/2011 | Harmer | 713/2 |
| 2011/0225274 A1 * | 9/2011 | Dvorkin et al. | 709/222 |

OTHER PUBLICATIONS

Nehalem (microarchitecture), wikipedia, the free encyclopedia, retreived on Apr. 2, 2011, webpage available at: http://en.wikipedia.org/wiki/Nehalem (microarchitecture).

Dehnert, et al.,The Transmeta Code Morphing™ Software: using speculation, recovery, and adaptive retranslation to address real-life challenges, Appeared in the proceedings of the first IEEE/ACM International symposium on Code Generation and Optimization, Mar. 27-29, 2003, pp. 1-10.

Transmeta, wikipedia, the free encyclopedia, retreived on Apr. 2, 2011, webpage available at: http://en.wikipedia.org/wiki/Transmeta.

* cited by examiner

*Primary Examiner* — Paul Yanchus, III
*Assistant Examiner* — Zahid Choudhury
(74) *Attorney, Agent, or Firm* — Barnes & Thornburg LLP

(57) ABSTRACT

A method and system for remote configuration of a computing device includes generating initialization code configured to initialize a memory and/or processor of the computing device dependent on initialization data. The initialization data is generated based on platform data, which is validate based on predetermined criteria. The platform data identifies platform-specific parameters and may be received over a network from a platform manufacturer. In response to validation of the platform data, the initialization data is generated and transmitted to the platform manufacturer for incorporation into the computing device. Upon a processor reset, the initialization code is configured to use the initialization data to perform initialization procedures to initialize the memory and/or processor of the computing device. The platform data may be updated periodically by an end-user of the computing device.

20 Claims, 5 Drawing Sheets

METHOD AND SYSTEM FOR REMOTE CONFIGURATION OF A COMPUTING DEVICE

BACKGROUND

Upon power-up or reset, a typical computing device executes initial platform firmware, such as basic input/output system (BIOS) firmware or extensible firmware interface (EFI), to initialize the various components and interconnects of the computing device. A portion of the initial platform firmware (e.g., memory reference code (MRC)) is configured to initialize the memory, such as the memory controller, and/or processor of the computing device.

Typically, the memory initialization firmware portion of the BIOS/EFI is provided by the manufacturer of the memory controller and/or processor incorporated in the computing device. However, because the memory initialization firmware is dependent upon particular parameters of the computing platform, which may be unknown to the manufacturer of the memory controller, the memory initialization firmware is provided in source code or non-executable form to the platform manufacturer. The platform manufacturer may subsequently modify the memory initialization firmware based on the platform-specific parameters of the computing device. However, the memory initialization firmware may become unstable or otherwise result in unknown or inadvertent performance should any unforeseen errors occur during the modification procedure.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
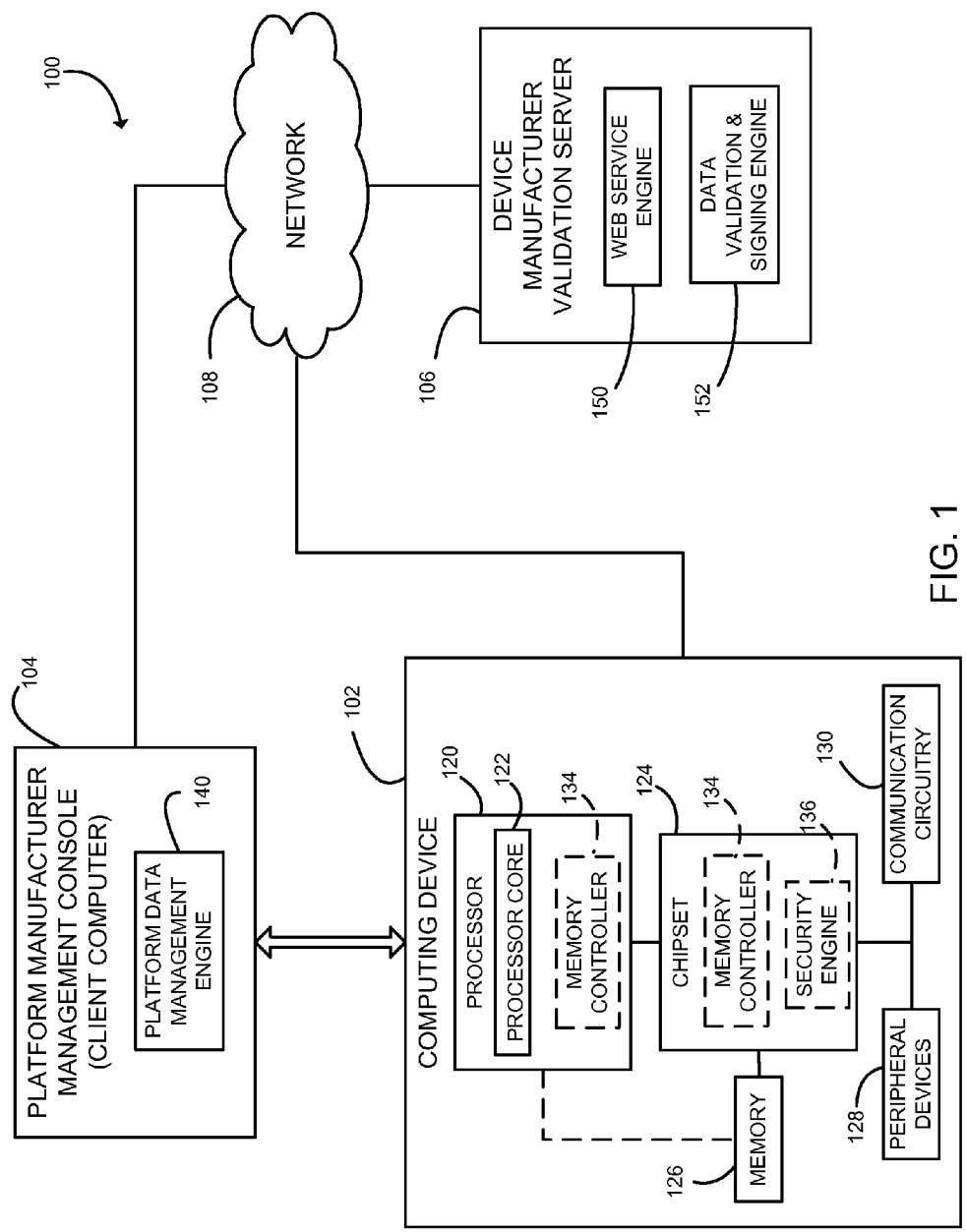
FIG. 1 is a simplified block diagram of one embodiment of a system for remote configuration of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a tangible, machine-readable medium, which may be read and executed by one or more processors. A tangible, machine-readable medium may include any tangible mechanism for storing or transmitting information in a form readable by a machine (e.g., a computing device). For example, a tangible, machine-readable medium may include read only memory (ROM); random access memory (RAM); magnetic disk storage media; optical storage media; flash memory devices; and others.

Referring now to FIG. 1, a system 100 for remotely configuring a computing device 102 includes a platform manufacturer management console or client computer 104, a device manufacturer validation server 106, and a network 108. In use, as discussed in more detail below, the client computer 104 communicates with the validation server 106 over the network 108 to remotely configure initialization firmware code for initializing devices of the computing device 102, such as memory controllers and processors. To do so, initialization code is generated by the device manufacture for initializing the devices. In some embodiments, the initialization code is portable across various platforms and is provided to the platform manufacturer for incorporation in the computing device 102. However, to properly initialize the memory controller, processor, and/or other devices of the computing device 102, platform-specific parameters are required by the initialization code. As such, the initialization code is customized for the particular platform (i.e., computing device 102) based on initialization data, which is accessed and used by the initialization code to perform one or more initialization procedures.

The initialization data is generated based on the platform-specific parameters. To do so, the client computer 104 may transmit platform data, which includes the platform-specific parameters, to the validation server 106 via the network 108.

As discussed below, the platform-specific parameters may include such platform-specific data as memory frequency mode settings of the computing device 102, bus routing parameters for a system management bus of the computing device 102, and/or the other platform-specific data related to the components (e.g., memory controller, processor, processor data links, etc) of the computing device 102. The validation server 106 analyzes the platform data to validate the data based on predetermined criteria. For example, the validation server may ensure that the platform data is complete, within predefined threshold values, properly formatted, and/or the like. If the platform data is validated, the validation server 106 generates the initialization data based on the platform data and digitally signs the initialization data. The initialization data may be substantially similar to the platform data (e.g., the initialization data may be the platform data reformatted into a format expected by the initialization code) or may be based thereon (e.g., a newly generated data file based on the platform data). The validation server 106 subsequently transmits the initialization data and the digital signature to the client computer 104. The initialization data and digital signature are stored in the computing device 102 for use during initialization procedures. In some embodiments, a similar process is used to validate user updated platform data after the end-user has adjusted user settings. For example, the computing device 102 may communicate with the validation server 106 over the network 108 to validate the updated platform data, receive new initialization data from the validation server 106, and store the new initialization data for use by the initialization code as discussed above.

Although only one computing device 102, one client computer 104, one device validation server 106, and one network 108 are illustratively shown in FIG. 1, the system 100 may include any number of computing devices 102, client computers 104, validation servers 106, and networks 108 of similar or dissimilar architecture. For example, the validation server 106 may be configured to communicate with multiple client computers 104, which may be operated by different platform manufacturers, and computing devices 102 over the network 108 in some embodiments.

The computing device 102 may be embodied as any type of computing device capable of performing the functions described herein. For example, the computing device 102 may be embodied as a desktop computer, a laptop computer, a mobile internet device, a handheld computer, a smart phone, a personal digital assistant, a telephony device, or other computing device. In the illustrative embodiment of FIG. 1, the computing device 102 includes a processor 120, a chipset 124, a memory 126, one or more peripheral devices 128, and communication circuitry 130. In some embodiments, several of the foregoing components may be incorporated on a motherboard of the computing device 102, while other components may be communicatively coupled to the motherboard via, for example, a peripheral port. Furthermore, it should be appreciated that the mobile computing device 102 may include other components, sub-components, and devices commonly found in a computer and/or computing device, which are not illustrated in FIG. 1 for clarity of the description.

The processor 120 of the computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the computing device 102 may include additional processors 120 having one or more processor cores 122.

The chipset 124 of the computing device 102 may include a memory controller hub 134 (MCH or "northbridge"), an input/output controller hub (ICH or "southbridge"), and a firmware device. The firmware device of the chipset 124 may be embodied as a memory device for storing Basic Input/Output System (BIOS) data and/or instructions and/or other information (e.g., a BIOS driver used during booting of the mobile computing device 102). However, in other embodiments, chipsets having other configurations may be used. For example, in some embodiments, the chipset 124 may be embodied as a platform controller hub (PCH). In such embodiments, the memory controller hub 134 (MCH) may be incorporated in or otherwise associated with the processor 120, and the processor 120 may communicate directly with the memory 126 (as shown by the hashed line in FIG. 1).

In some embodiments, the chipset 124 may include a security engine 136. The security engine 136 may be embodied as hardware and/or firmware configured to perform security, encryption, and/or authentication functions as described in more detail below. For example, the security engine 136 may be embodied as or otherwise include an out-of-band processor, a trusted platform module (TPM), and/or other security enhancing hardware and/or associated software modules.

The processor 120 is communicatively coupled to the chipset 124 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The memory 126 of the computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 126 is communicatively coupled to the chipset 124 via a number of signal paths. Although only a single memory device 126 is illustrated in FIG. 1, the mobile computing device 102 may include additional memory devices in other embodiments. Various data and software may be stored in the memory device 126. For example, one or more operating systems, applications, programs, libraries, and drivers that make up the software stack executed by the processor 120 may reside in memory 126 during execution. Furthermore, software and data stored in memory 126 may be swapped between the memory 126 and a data storage device of the peripheral devices 128 as part of memory management operations.

The peripheral devices 128 of the computing device 102 may include any number of peripheral or interface devices. For example, the peripheral devices 128 may include a display, a keyboard, a mouse, one or more data storage devices such as an internal or external hard drive, and/or other peripheral devices. The particular devices included in the peripheral devices 128 may depend upon, for example, the intended use of the computing device 102. The peripheral devices 128 are communicatively coupled to the chipset 124 via a number of signal paths thereby allowing the chipset 124 and/or processor 120 to receive inputs from and send outputs to the peripheral devices 128.

The communication circuitry 130 of the remote mobile computing device 102 may be embodied as any number of devices and circuitry for enabling communications between the computing device 102 and remote computing devices (e.g., the validation server 106) over the network 108. The network 108 may be embodied as any number of various wired and/or wireless telecommunication networks. For example, the network 108 may be embodied as or otherwise include one or more cellular networks, telephone networks, local or wide area networks publicly available global networks (e.g., the Internet), or any combination thereof. Additionally, the network 108 may include any number of additional devices to facilitate communication between the computing device 102, the client computer 104, and the validation server 106 such as routers, switches, intervening computers, and/or the like. The computing device 102, the client computer 104, and the validation server 106 may use any suitable communication protocol to communicate with each other over the network 108 depending on, for example, the particular type of network(s) 108.

The platform manufacturer management console or client computer 104 may be embodied as any type of computer or computing device capable of communicating with the validation server 106 and performing the functions described herein. For example, in one embodiment, the client computer 104 includes devices and circuitry substantially similar to the computing device 102 such as a processor, chipset, memory, various peripheral devices, and communication circuitry. The client computer 104 may include additional components, sub-components, and devices commonly found in a client computer and/or computing device, which are not illustrated in FIG. 1 for clarity of the description.

The client computer 104 includes a platform data management engine 140, which may be embodied as software and associated hardware devices. The platform data management engine 140 is configured to generate platform data for the computing device 102 based on the platform-specific parameters of the computing device (e.g., memory timings, bus speeds, etc). The platform data management engine 140 transmits the prepared platform data to the validation server 106 for validation. Upon validation by the server 106, the platform data management engine 140 receives initialization data from the validation server 106 and may initiate or otherwise provide management activities over the incorporation of the initialization data into the computing device 102. Additionally, the platform data management engine 140 may be configured to manage multiple platform data instances, covering different platforms or embodiments of the computing device 102.

Similar to the client computer 104, the device manufacturer validation server 106 may be embodied as any type of computer or computing device capable of communicating with the client computer 104 (and the computing device 102) and performing the functions described herein. For example, in one embodiment, the validation server includes devices and circuitry substantially similar to the computing device 102 such as a processor, chipset, memory, various peripheral devices, and communication circuitry. The validation server 106 may include additional components, sub-components, and devices commonly found in a computer server, which are not illustrated in FIG. 1 for clarity of the description.

The validation server 106 includes a web service engine 150 and a data validation and signing engine 152, each of which may be embodied as software and associated hardware devices. The web service engine 150 provides a web portal accessible by the client computer 104 and the computing device 102 to communicate with the validation server 106. Depending on the specific implementation, such web portal may be manual, semi-automated, or automated.

The data validation and signing engine 152 is configured to validate the platform data provided by the client computer 104 or the computing device 102 based on predetermined criteria. The data validation and signing engine 152 also generates the initialization data based on the platform data and digitally signs the initialization data prior to transmitting the initialization data to the client computer 104 or computing device 102 as discussed in more detail below. Additionally, in some embodiments, the data validation and signing engine 152 may perform encryption/decryption procedures on the platform data and initialization data.

Figure 2:
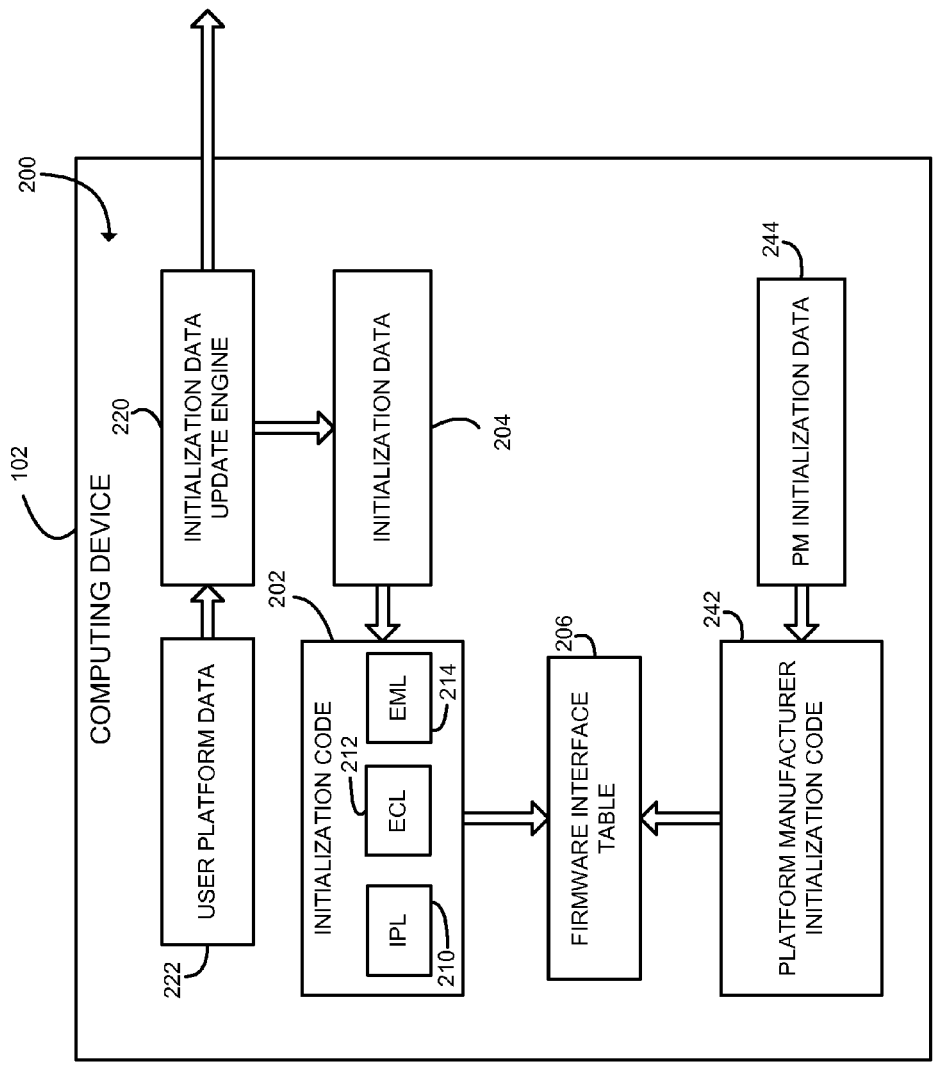
FIG. 2 is a simplified block diagram of a software environment of the computing device of FIG. 1.

In use, as discussed above, the client computer 104 (or computing device 102) is configured to transmit platform data to the validation server 106 over the network 108 for validation. The validation server 106 analyzes the platform data to ensure its validity and generates initialization data for use by initialization code to initialize components of the computing device 102, such as memory controller 134 and/or processor 120. The initialization code and validated initialization data are stored on the computing device 102. For example, as illustrated in FIG. 2, a software environment 200 of the computing device 102 may include the initialization code 202 and the initialization data 204. The initialization code 202 may be embodied as binary, executable code generated by or otherwise provided by the device manufacturer to the platform manufacturer. In some embodiments, the initialization code 202 is obtainable from the validation server 106 (e.g., the initialization code 202 may be downloaded from the server 106). The initialization code 202 may form a portion of the BIOS/EFI of the computing device 102 and is configured to be executed upon power up of the device 102 or after reset of the processor 120. To do so, the initialization code 202 may include one or more sub-component initialization code. For example, in one embodiment, the initialization code 202 may include an initial program loader (IPL) component 210, an embedded CPU logic (ECL) component 212, embedded memory logic (EML) component 214, and/or other initialization code components configured to perform particular initialization procedures.

As discussed above, the initialization code 202 is configured to initialize components of the computing device 102, such as the memory controller 134, the processor 120, and/or data links between processors 120 in those embodiments in which the computing device 102 includes multiple processors, using the initialization data 204. The initialization data 204 is validated by the validation server 106 as discussed above and stored on the computing device 102 in a non-volatile memory location. The particular location of the initialization data 204 may be stored in a firmware interface table 206, which is accessed by the initialization code 202 to determine the location of the initialization data 204. The initialization code 202 accesses the initialization data 204 and performs one or more initialization procedures determined by or otherwise based on the initialization data 204.

In some embodiments, the end-user of the computing device 102 may be allowed to adjust or modify particular platform-specific parameters, such as BIOS settings and/or the like. Such modifications may also affect the initialization data 204 and the initialization procedures performed by the initialization code 202. As such, the software environment 200 of the computing device 102 may also include an initialization data update engine 220. The initialization data update engine 220 is configured to access user platform data 222, which is generated in response to the user modifying the platform-specific parameters, and transmit the user platform data 222 to the validation server 106 over the network 108. The validation server 106 validates the user platform data 222 in a manner similar to the platform data received from the client computer 104 and generates new initialization data based on the user platform data 222. The initialization data update engine 220 is configured to update the initialization data 204 (and the firmware interface table 206 if required) with the new initialization data received from the validation server 106. In this way, an end-user of the computing device 102 may update or modify platform-specific parameters of the device 102 without adversely affecting the operation of the initialization code 202.

Additionally, in some embodiments, the software environment 200 may include a platform manufacturer initialization code 242 and platform manufacturer initialization data 244 separate from the initialization code 202 and initialization data 204. The platform manufacturer initialization code 242 supplements the initialization procedures performed by the initialization code 202 but is generally under the control of the platform manufacturer and/or user of the computing device 102. The platform manufacturer initialization code 242 may, for example, perform initialization of additional devices, firmware, or software of the computing device 102 based on the platform manufacturer initialization data 244. The platform manufacturer initialization data 244 may be stored on the computing device 102 in a non-volatile memory location. Similar to the initialization data 204, the particular location of the platform manufacturer initialization data 244 may be stored in the firmware interface table 206, which is accessed by the platform manufacturer initialization code 242 to determine the location of the platform manufacturer initialization data 244. The platform manufacturer initialization code 242 accesses the platform manufacturer initialization data 244 and performs one or more additional initialization procedures determined by or otherwise based on the platform manufacturer initialization data 244.

Because the platform manufacturer initialization code 242 and the platform manufacturer initialization data 244 are generated and controlled by the platform manufacturer, the platform manufacturer may affect changes in the overall BIOS/EFI code by providing updates or otherwise changing the platform manufacturer initialization code 242 and/or the platform manufacturer initialization data 244. In this way, the platform manufacturer may update portions of the BIOS/EFI of the computing device 102 without affecting the initialization code 202 or initialization data 204 and without the necessity of third-party validation by the validation server 106. As such, the platform manufacturer may use any suitable provisioning model to incorporation and/or update the platform manufacturer initialization code 242 and/or the platform manufacturer initialization data 244.

Figure 3:
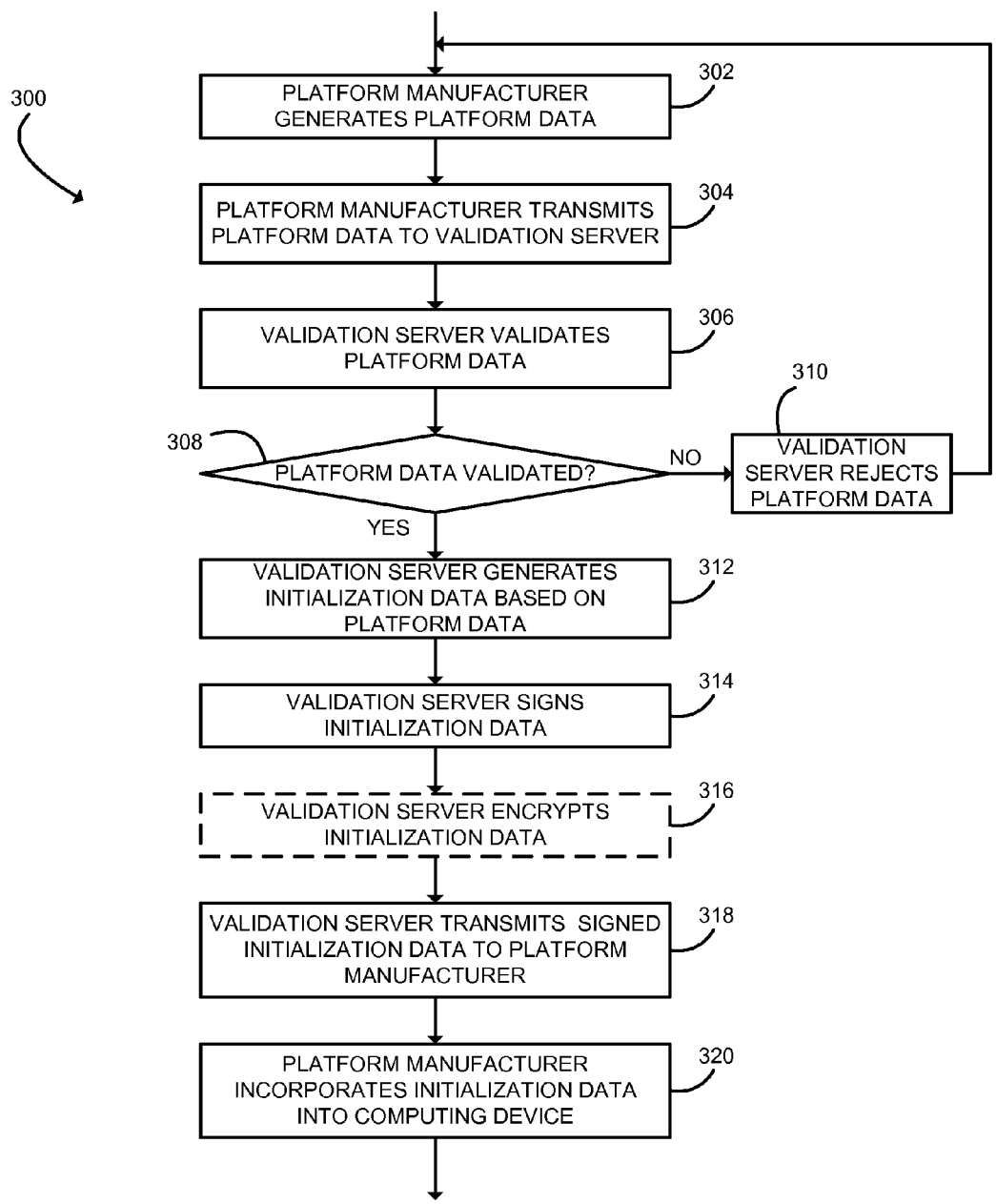
FIG. 3 is a simplified flow diagram of one embodiment of a method for remotely configuring the computing device of FIG. 1.

Referring now to FIG. 3, one illustrative embodiment of a method 300 for remotely configuring the computing device 102 using the system of FIG. 1 begins with block 302. In block 302, the platform manufacturer generates the platform data related to the computing device 102. As discussed above, the platform data includes or otherwise identifies platform-specific parameters related to the memory (e.g., the memory controller 134) or processor 120 of the computing device 102. The platform data may be embodied as any type of platform-specific parameter data in any suitable format that may be transmitted to the validation server 106. In some embodiments, a software program or tool such as the platform data management engine 140 may be used to generate the platform data in a specific format.

In block 304, the client computer 104 transmits the platform data to the validation server 106 over the network 108. The validation server 106 analyzes and validates the platform data in blocks 306 and 308. The validation server 106 may validate the platform data based on predetermined criteria such as completeness of the data (e.g., is there any data not included), accuracy of the data (e.g., do particular values of the platform data fall within predetermined threshold values), and/or other criteria. If the validation server 106 is unable to validate the platform data in block 308, the validation server 106 rejects the platform data in block 310 and the method 300 loops back to block 302 in which the platform manufacture may modify or update the platform data for resubmission to the validation server 106. If, however, the validation server 106 successfully validates the platform data, the method 300 advances to block 312.

In block 312, the validation server 106 generates the initialization data 204 based on the platform data. As discussed above, the initialization data 204 is used by the initialization code 202 (which may be previously provided to the platform manufacturer by the device manufacturer) to initialize components of the computing device 102. In some embodiments, the initialization data 204 may be substantially similar to the platform data or may be new data generated based on the platform data.

In block 314, the validation server 106 digitally signs the initialization data 204. To do so, in some embodiments, the validation server 106 may generate a digital signature certificate based on the pre-generated encryption keys and the initialization data 204. Such digital signature may be used by the client computer 104 and the computing device 102 to ensure the authenticity of the initialization data 204. Additionally, in some embodiments, the validation server 106 is configured to encrypt the initialization data 204 in block 316 using, for example, the pre-generated encryption keys.

In block 318, the validation server 106 transmits the signed initialization data 204 to the client computer 104. The client computer 104 may be configured to verify the digital signature included with the initialization data 204 to ensure its authenticity. Subsequently, in block 320, the platform manufacture incorporates the initialization data 204 into the computing device 102. For example, the initialization data 204 may be stored in a non-volatile memory space of the device 102 and the firmware interface table 206 may be updated accordingly. In this way, initialization code 202 for the computing device 102 may be remotely customized based on platform-specific parameters via use of the system 100.

Figure 4:
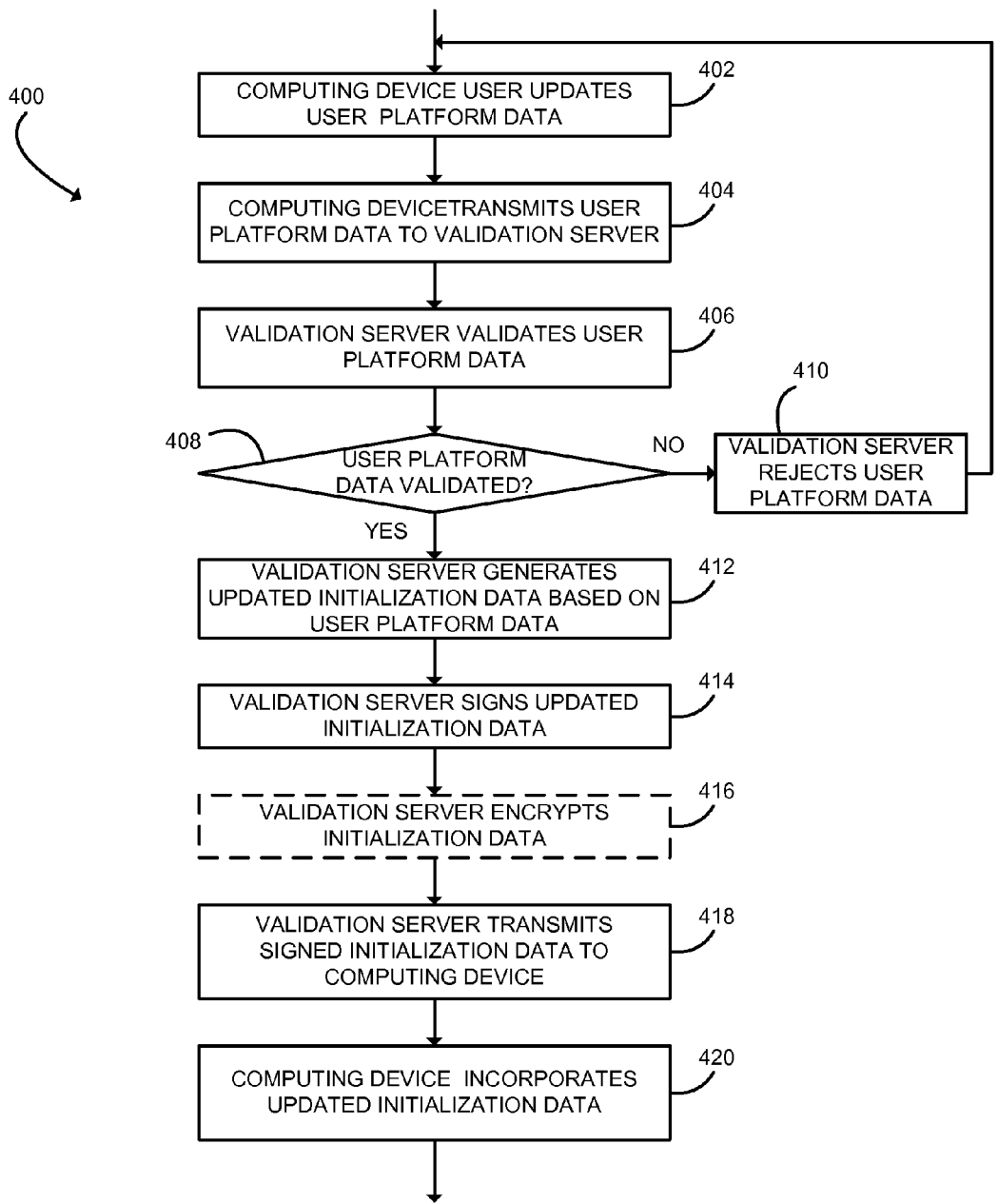
FIG. 4 is a simplified flow diagram of another embodiment of a method for remotely configuring the computing device of FIG. 1.

As discussed above, in some embodiments, the end-user of the computing device 102 may have the ability to modify or update particular platform-specific parameters, which may have an impact on or otherwise affect the platform data and/or initialization data 204. As such, a method 400 for remotely configuring the computing device 102 based on updated platform data may be used. As shown in FIG. 4, the method 400 beings with block 402 in which the user of the computing device 102 updates the platform data. For example, the user may update particular BIOS/EFI settings, modify the hardware of the computing device 102, or perform other activities that affect or otherwise modify the platform data. In block 404, the computing device 102 (i.e., the initialization data 204 update engine 220) transmits the user updated platform data to the validation server 106 over the network 108. The validation server 106 validates the user updated platform data in blocks 406 and 408 as described above in regard to blocks 306 and 308 of method 300. If the validation server 106 is unable to validate the user updated platform data, the validation server 106 rejects the platform data in block 340 and the method 400 loops back to block 402.

If, however, the validation server 106 successfully validates the platform data, the method 300 advances to block 412 in which the validation server 106 generates updated initialization data 204 based on the user updated platform data as discussed above in regard to block 312 of method 300. In block 414, the validation server digitally signs the updated initialization data 204. Additionally, in some embodiments, the validation server 106 may to encrypt the updated initialization data 204 in block 416.

In block 418, the validation server 106 transmits the signed, updated initialization data 204 to the computing device 102 over the network 108. The computing device 102 may be configured to verify the digital signature included with the updated initialization data 204 to ensure its authenticity. Subsequently, in block 320, the computing device 102 (e.g., the initialization data 204 update engine 220) incorporates the initialization data 204 into the software environment 200 of the device 102. For example, as discussed above in regard to the method 300, the initialization data 204 may be stored in a non-volatile memory space of the device 102 and the firmware interface table 206 may be updated accordingly. In this way, an end-user of the computing device 102 may update the platform-specific parameters of the computing device 102 while maintaining the integrity and usability of the initialization code 202 and associated initialization data 204.

Figure 5:
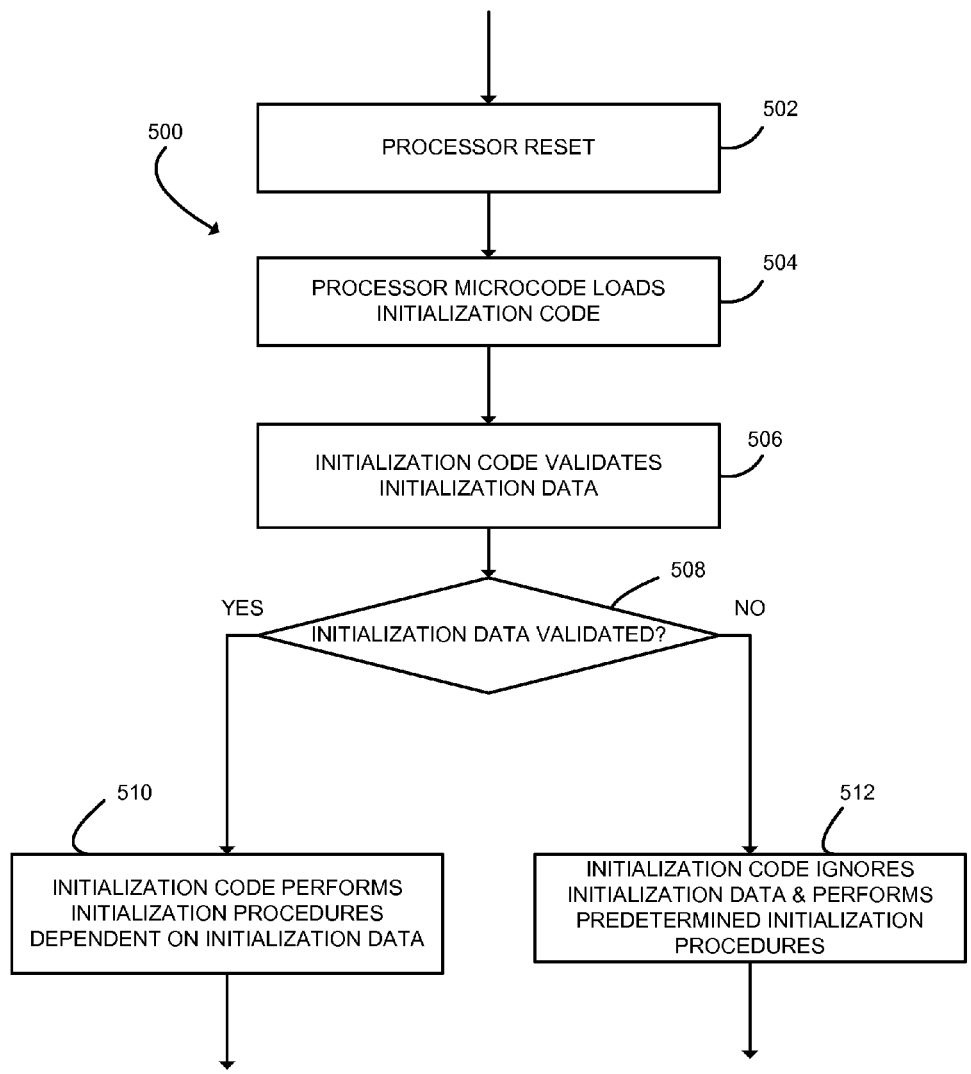
FIG. 5 is a simplified flow diagram of one embodiment of method for initializing components of the computing device of FIG. 1.

As discussed above, the initialization code 202 is configured to initialize the memory (e.g., the memory controller 134) and/or other components (e.g., the processor 120, data links between processors 120, etc.) of the computing device 102 using the initialization data 204. To do so, the computing device 102 may execute a method 500 for initializing components of the device 102 as illustrated in FIG. 5. The method 500 begins with block 502 in which the processor(s) 120 are reset. Such reset may occur upon power-up of the computing device 102 or in response to a restart, reboot error, or the like. In block 504, the processor microcode, which is executed by the processor 120 upon rest, loads or otherwise executes the initialization code 202. In block 506, the initialization code 202 locates the initialization data 204 via use of the firmware interface table 206 as discussed above in regard to FIG. 2.

Once located, the initialization code 202 validates the initialization data 204 to ensure its authenticity in blocks 506 and 508. Such validation procedure may include verifying that the initialization data 204 has been signed by the validation server 106, is properly encrypted, and/or meets other predetermined criteria. As discussed above, the initialization code 202 may be generated by the microcontroller and/or processor manufacturer for incorporation into the computing device 102. If the initialization data 204 is not validated in block 508, the method 500 advances to block 510 in which the initialization code 202 ignores the initialization data 204 and performs other predetermined initialization procedures, which may include displaying an error message on the computing device 102 and entering a safe mode of operation. Alternatively, if the initialization data 204 is validated in block 508, the method 500 advances to block 512 in which the initialization code 202 performs one or more initialization procedures dependent on the initialization data 204. Such initialization procedures may include, for example, initializing the memory controller 134, initializing the processor 120, initializing data links between processors 120 in multiprocessor embodiments, and/or initializing other components of the computing device 102.

while the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
generating initialization code to initialize a memory of a computing device, memory controller of the computing device, a plurality of processors of the computing device, and a plurality of data links between the plurality of processors of the computing device;
receiving platform data over a network from a client computer, the platform data identifying platform-specific parameters related to the memory of the computing device;
validating the platform data dependent upon predetermined criteria; generating initialization data based on the platform data in response to the validation of the platform data, the initialization data to be used by the initialization code to initialize the memory;
and transmitting the initialization data to the client computer over the network.

2. The method of claim 1, wherein generating initialization code comprises generating initialization code that is portable across a plurality of different computing platforms.

3. The method of claim 1, wherein receiving platform data comprises receiving platform data that identifies memory frequency mode settings of the memory of the computing device.

4. The method of claim 1, wherein receiving platform data comprises receiving platform data that identifies bus routing parameters for a system management bus of the computing device.

5. The method of claim 1, wherein validating the platform data comprises verifying that a plurality of values of the platform data are within predefined threshold values.

6. The method of claim 1, wherein generating initialization data comprises digitally signing the initialization data.

7. The method of claim 6, wherein digitally signing the initialization data comprises generating a digital signature associated with the initialization data and transmitting the digital signature to the client computer.

8. The method of claim 1, further comprising encrypting the initialization data prior to transmitting the initialization data.

9. The method of claim 1, further comprising providing the initialization code to a platform manufacturer.

10. One or more non-transitory, machine readable media comprising a plurality of instructions that in response to being executed result in a computing device:
generating user updated platform data based on input received from a user of the computing device, the user updated platform data identifying platform-specific parameters related to a memory of the computing device;
transmitting the user updated platform data over a network to a server computer;
receiving initialization data from the server computer in response to the user updated platform data being validated by the server computer, the initialization data to be used by initialization code executed by the computing device to initialize the memory and a processor of the computing device; and storing the initialization data in the memory of the computing device.

11. The one or more non-transitory, machine readable media of claim 10, wherein receiving the initialization data from the server computer comprises receiving a digital signature associated with the initialization data from the server computer.

12. The one or more non-transitory, machine readable media of claim 10, wherein receiving the initialization data from the server computer comprises (i) receiving encrypted initialization data from the server computer and (ii) decrypting the encrypted initialization data.

13. The one or more non-transitory, machine readable media of claim 10, wherein the plurality of instructions further result in the computing device encrypting the user updated platform data prior to transmitting the user updated platform data to the server computer.

14. The one or more non-transitory, machine readable media of claim 10, wherein the plurality of instructions further result in the computing device executing, in response a processor reset of the computing device, the initialization code to initialize the memory of the computing device.

15. A computing device comprising:
a first processor;
a second processor communicatively coupled to the first processor via a plurality of data links; and
a firmware memory having stored therein initialization code that is executed by the processor in response to the processor being reset, the initialization code causing the processor to:
access initialization data stored in the firmware memory, the initialization data generated based on platform-specific parameters of the computing device related to a memory controller of the computing device;
initialize the processor dependent on the initialization data; and
initialize the memory controller dependent on the initialization data,
wherein the initialization code causes at least one of the first processor and the second processor to initialize the data links dependent on the initialization data.

16. The computing device of claim 15, wherein the initialization code causes the processor to verify that the initialization data has been digitally signed by a manufacturer of the processor.

17. A computing device server comprising:
a data validation engine to: (i) generate initialization code to initialize a memory of a computing device, memory controller of the computing device, a plurality of processors of the computing device, and a plurality of data links between the plurality of processors of the computing device, (ii) receive platform data over a network from a client computer, the platform data identifying platform-specific parameters related to the memory of the computing device, (iii) validate the platform data dependent upon predetermined criteria, (iv) generate initialization data based on the platform data in response to the validation of the platform data, the initialization data to be used by the initialization code to initialize the memory; and a web service engine to transmit the initialization data to the client computer over the network.

18. The computing device of claim 17, wherein the platform data identifies memory frequency mode settings of the memory of the computing device.

19. The computing device of claim 17, wherein the platform data identifies bus routing parameters for a system management bus of the computing device.

20. The computing device of claim 17, wherein the data validation engine comprises a data validation engine to verify that a plurality of values of the platform data are within predefined threshold values.

* * * * *